United States Patent
Sammer et al.

(10) Patent No.: US 10,562,493 B2
(45) Date of Patent: Feb. 18, 2020

(54) METHOD, COMPUTER PROGRAM AND DEVICE FOR REDUCING INTERFERENCE OF TEMPORARY COMMUNICATION RESOURCES USED FOR WIRELESS COMMUNICATION BETWEEN A TRANSPORTATION VEHICLE KEY AND A TRANSPORTATION VEHICLE

(71) Applicant: VOLKSWAGEN AKTIENGESELLSCHAFT, Wolfsburg (DE)

(72) Inventors: Patrick Sammer, Berlin (DE); Karsten Beyer, Berlin (DE); Claus-Peter Brückner, Braunschweig (DE); Christian Wick, Cremlingen (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 16/068,274

(22) PCT Filed: Dec. 7, 2016

(86) PCT No.: PCT/EP2016/080088
§ 371 (c)(1),
(2) Date: Jul. 5, 2018

(87) PCT Pub. No.: WO2017/118510
PCT Pub. Date: Jul. 13, 2017

(65) Prior Publication Data
US 2019/0023224 A1     Jan. 24, 2019

(30) Foreign Application Priority Data
Jan. 6, 2016  (DE) ........................ 10 2016 200 060

(51) Int. Cl.
*B60R 25/20* (2013.01)
*H04B 15/02* (2006.01)
*H04W 72/08* (2009.01)

(52) U.S. Cl.
CPC ......... *B60R 25/2072* (2013.01); *H04B 15/02* (2013.01); *H04W 72/082* (2013.01)

(58) Field of Classification Search
None
See application file for complete search history.

(56) References Cited

U.S. PATENT DOCUMENTS 7,123,874 B1   10/2006  Brennan
9,911,262 B2 *  3/2018  Tschache ........... G07C 9/00309
(Continued)

FOREIGN PATENT DOCUMENTS

DE        10259590 A1     7/2004
DE        10334625 A1     3/2005
(Continued)

OTHER PUBLICATIONS

Search Report for German Patent Application No. 10 2016 200 060.8; dated Sep. 28, 2016.
(Continued)

*Primary Examiner* — Carlos Garcia
(74) *Attorney, Agent, or Firm* — Barnes & Thornburg LLP

(57) ABSTRACT

A method, a computer program, and a device for reducing interference of temporary communication resources used for a wireless communication between a transportation vehicle key and a transportation vehicle. The method includes determining whether interference of the temporary communication resources is present and switching off the device causing the interference or adjusting the use of the temporary communication resources for the wireless communication between the transportation vehicle key and the transportation vehicle in response to interference being present.

19 Claims, 3 Drawing Sheets

(56) References Cited

U.S. PATENT DOCUMENTS

| | | | |
|---|---|---|---|
| 2006/0267744 A1 | 11/2006 | Baumgartner et al. | |
| 2010/0321154 A1* | 12/2010 | Ghabra | B60R 25/00 340/5.61 |
| 2011/0151827 A1 | 6/2011 | Snider | |
| 2014/0320260 A1 | 10/2014 | Van Wiemeersch et al. | |
| 2015/0057884 A1 | 2/2015 | Bongiorno et al. | |

FOREIGN PATENT DOCUMENTS

| | | |
|---|---|---|
| DE | 102004062506 A1 | 7/2006 |
| DE | 102006042453 A1 | 3/2008 |
| DE | 102007039599 A1 | 3/2008 |
| DE | 102013007003 A1 | 11/2014 |
| DE | 102014105726 A1 | 11/2014 |
| EP | 0955217 A2 | 11/1999 |
| EP | 1499522 A1 | 1/2005 |
| EP | 2465737 A2 | 6/2012 |
| EP | 2672608 A1 | 12/2013 |
| GB | 2438009 A | 11/2007 |
| JP | H08130803 A | 5/1996 |
| WO | 2006101713 A1 | 9/2006 |
| WO | 2007027991 A2 | 3/2007 |
| WO | 2008028461 A1 | 3/2008 |
| WO | 2015149962 A1 | 10/2015 |

OTHER PUBLICATIONS

Search Report for International Patent Application No. PCT/EP2016/080088; dated Mar. 2, 2017.

* cited by examiner

METHOD, COMPUTER PROGRAM AND DEVICE FOR REDUCING INTERFERENCE OF TEMPORARY COMMUNICATION RESOURCES USED FOR WIRELESS COMMUNICATION BETWEEN A TRANSPORTATION VEHICLE KEY AND A TRANSPORTATION VEHICLE

PRIORITY CLAIM

This patent application is a U.S. National Phase of International Patent Application No. PCT/EP2016/080088, filed 7 Dec. 2016, which claims priority to German Patent Application No. 10 2016 200 060.8, filed 6 Jan. 2016, the disclosures of which are incorporated herein by reference in their entireties.

SUMMARY

Illustrative embodiments relate to a method, a computer program and an apparatus for reducing interference in temporary communication resources used for wireless communication between a transportation vehicle key and a transportation vehicle, for instance, by ascertaining whether there is interference in the temporary communication resources.

BRIEF DESCRIPTION OF THE DRAWINGS

Disclosed embodiments are described in more detail below which are illustrated in the drawings, but to which there is generally no restriction overall. In the drawings.

DETAILED DESCRIPTION

Figure 1:
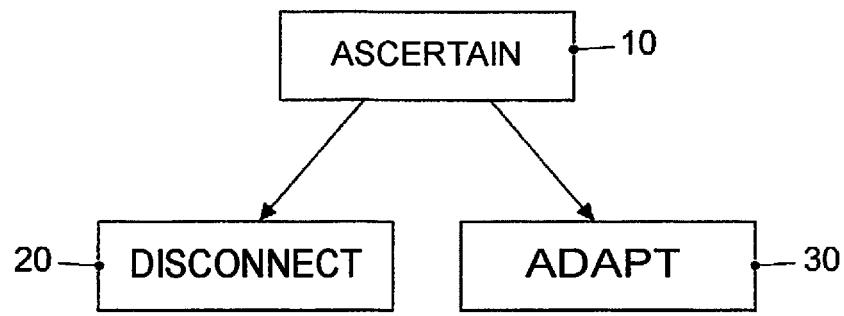
FIG. 1 illustrates a flowchart of an exemplary embodiment of a method for reducing interference in temporary communication resources used for wireless communication between a transportation vehicle key and a transportation vehicle.

The security for access and driving authorization for a transportation vehicle usually plays a key role. A large amount of effort is often expended to prevent unauthorized access to a transportation vehicle. The same applies to the driving authorization. Transportation vehicle keys often comprise security systems to prevent or hinder copying of the keys or access to the transportation vehicle or its mobility without a valid key. These security systems may be based, for example, on a transponder which is activated by a magnetic field from an immobilizer system or by a search signal and can wirelessly transmit secure authentication data to the transportation vehicle.

In addition to conventional access systems, transportation vehicle keys are being developed which can make it possible to access the transportation vehicle without transmission of a key being explicitly activated by a user (so-called keyless entry) or can make it possible to start the transportation vehicle without inserting the transportation vehicle key into an ignition lock of the transportation vehicle (so-called keyless go). The presence of the transportation vehicle key is checked, for example, upon entry to the transportation vehicle, when starting the transportation vehicle, during the journey, when closing a window, during remotely controlled parking or when closing or opening a convertible roof outside the transportation vehicle. Transmission of the secure authentication data or of the search signal via a wireless connection can be impaired in this case by interferers, for example, devices which emit signals or interference in frequency ranges which are also used for the wireless transmission of the electronic access key.

Therefore, there is a need to provide an improved concept for wireless communication between a transportation vehicle key and a transportation vehicle. This need is taken into account by the method, the computer program and the apparatus according to the independent claims.

Some exemplary embodiments can this by detecting whether there is interference in temporary communication resources used for the wireless communication between the transportation vehicle key and the transportation vehicle. If there is interference, either the interference can be disconnected (for instance, by deactivating a transportation vehicle component, for example, a wireless charging cradle) or the temporary communication resources for the wireless communication can be adapted, for example, by shifting a transmission time or/and increasing the transmission power of the useful signal.

Exemplary embodiments provide a method for reducing interference in temporary communication resources used for wireless communication between a transportation vehicle key and a transportation vehicle. The method comprises ascertaining whether there is interference in the temporary communication resources. If there is interference, the method also comprises disconnecting an interferer causing the interference or adapting the use of the temporary communication resources for the wireless communication between the transportation vehicle key and the transportation vehicle. Ascertaining the interference increases the communication reliability since a malfunction can be avoided in some cases. Reducing the transmission power of the interferer or disconnecting the interferer can reduce or eliminate interference, and adapting the use of the temporary communication resources can make it possible to use communication resources in which interference is reduced. The method can also achieve a robustness of the overall wireless communication system on the overall transportation vehicle level. A response time to interferers can also be reduced and restrictions of a keyless system run time can be reduced or avoided.

In some exemplary embodiments, the ascertainment can be carried out before communication between the wireless transportation vehicle key and the transportation vehicle. Ascertaining the interference before the communication can increase the communication reliability.

In some exemplary embodiments, a frequency range which is used for the wireless communication between the transportation vehicle key and the transportation vehicle has interference from an interference signal from the interferer. Disconnecting the interferer can reduce or eliminate interference, and adapting the use of the temporary communication resources can make it possible to use temporary communication resources in which interference is reduced.

In some exemplary embodiments, the disconnection of the interferer can correspond to disconnection of an interferer included in the transportation vehicle. Alternatively or additionally, the disconnection of the interferer can correspond to disconnection of an interferer coupled to the transportation vehicle. An interferer which is included in the transportation vehicle or is coupled to the transportation vehicle can be temporarily disconnected, for example, by the method to temporarily enable the wireless communication.

In at least some exemplary embodiments, the ascertainment comprises ascertaining a subset of temporary communication resources used by an interferer. The adaptation can comprise, for example, adapting a transmission time for the wireless communication between the transportation vehicle key and the transportation vehicle, thus reducing a collision between the subset of temporary communication resources used by the interferer and the temporary communication resources for the wireless communication between the transportation vehicle key and the transportation vehicle. The adaptation, for example, by shifting a transmission time, can reduce collisions and can reduce or eliminate interference in the wireless communication.

In some exemplary embodiments, the ascertainment comprises detecting interference on the basis of a receiver for the wireless communication between the transportation vehicle key and the transportation vehicle or on the basis of a further receiver. The detection on the basis of a receiver, for example, by monitoring a frequency range or by identifying interference signals, can make it possible to ascertain and/or locate interference sources outside the system.

In some exemplary embodiments, the ascertainment can comprise receiving a notification relating to a malfunction from the transportation vehicle key. The transportation vehicle key can be designed, for example, to determine that the transmission of a key command fails and can communicate a notification to the transportation vehicle, for example, via another time or frequency resource. The interference can be measured directly at the location of the communication receiver, for example.

For example, a first frequency range can be used to transmit an activation signal between the transportation vehicle and the transportation vehicle key during the wireless communication. The ascertainment can comprise receiving a notification relating to a malfunction from the transportation vehicle key via a second frequency range which differs from the first frequency range. Transmitting the notification via a second frequency range can enable transmission in the case of an active interferer.

In at least some exemplary embodiments, the ascertainment can comprise determining the interference on the basis of previous communication. If wireless communication fails in a number of wireless communication operations, for example, or if wireless communication was announced and was not received (in an error-free manner), it can be detected that there is interference.

In some exemplary embodiments, the wireless communication between the transportation vehicle key and the transportation vehicle can be based on a key communication system. The interferer causing the interference can be an interferer outside the system. Ascertaining and reducing interference by an interferer outside the system can increase the wireless communication reliability and can reduce interference.

Exemplary embodiments also provide a program having a program code for carrying out the method according to one of the preceding claims. The program code can be executed on a computer, a processor, a control module or a programmable hardware component.

Exemplary embodiments also provide an apparatus for reducing interference in temporary communication resources used for wireless communication between a transportation vehicle key and a transportation vehicle. The apparatus comprises a control device designed to ascertain whether there is interference in the temporary communication resources. If there is interference, the control device is also designed to disconnect an interferer causing the interference or adapt the use of the temporary communication resources for the wireless communication between the transportation vehicle key and the transportation vehicle.

In some exemplary embodiments, the apparatus can also comprise a receiving device. The control device can be designed to control the receiving device. The control device can be designed to ascertain whether there is interference via the receiving device on the basis of a receiver for the wireless communication between the transportation vehicle key and the transportation vehicle, on the basis of a further receiver or on the basis of a notification relating to a malfunction, for instance, from the transportation vehicle key.

Another exemplary embodiment is a computer program for carrying out at least one of the methods described above when the computer program runs on a computer, a processor or a programmable hardware component. Another exemplary embodiment is also a digital storage medium which is machine-readable or computer-readable and has electronically readable control signals which can interact with a programmable hardware component in such a manner that one of the methods described above is carried out.

Different exemplary embodiments are now described in more detail with reference to the accompanying drawings in which some exemplary embodiments are illustrated. In the figures, the thickness dimensions of lines, layers and/or regions may be illustrated in an exaggerated form for the sake of clarity.

In the following description of the enclosed figures which show only some exemplary embodiments, identical reference symbols may denote identical or comparable components. Collective reference symbols may also be used for components and objects which occur repeatedly in an exemplary embodiment or in a drawing but are described together with regard to one or more features. Components or objects which are described with identical or collective reference symbols may be identical with respect to individual features, a plurality of features or all features, for example, their dimensions, but may possibly also be designed differently, unless explicitly or implicitly indicated otherwise in the description.

Although exemplary embodiments can be modified and altered in various ways, exemplary embodiments are illustrated in the figures as examples and are described in detail herein. However, it should be clarified that there is no intention to restrict exemplary embodiments to the forms disclosed in each case, but rather exemplary embodiments are intended to cover all functional and/or structural modifications, equivalents and alternatives within the scope of the disclosure. In the entire description of the figures, identical reference symbols denote identical or similar elements.

It should be noted that an element which is referred to as being "connected" or "coupled" to another element can be directly connected or coupled to the other element or elements may be present in between. In contrast, if an element is referred to as being "directly connected" or "directly coupled" to another element, there are no elements present in between. Other terms which are used to describe the relationship between elements should be interpreted in a similar manner (for example, "between" in comparison with "directly in between", "adjacent" in comparison with "directly adjacent" etc.).

The terminology used herein serves only to describe particular exemplary embodiments and is not intended to restrict the exemplary embodiments. As used herein, the singular forms "a(n)" and "the" are also intended to include the plural forms, unless clearly indicated otherwise by the context. Furthermore, it should be clarified that the expressions such as "contains", "containing", "has", "comprises", "comprising" and/or "having", as used herein, indicate the presence of stated features, whole numbers, operations, work sequences, elements and/or components, but do not rule out the presence or the addition of one or more features, whole numbers, operations, work sequences, elements, components and/or groups thereof.

Unless defined otherwise, all terms used herein (including technical and scientific terms) have the same meaning that is ascribed to them by a person of average skill in the art in the field to which the exemplary embodiments belong. Furthermore, it should be clarified that expressions, for example, those defined in generally used dictionaries, should be interpreted as if they had the meaning that is consistent with their meaning in the context of the relevant art, and should not be interpreted in an idealized or excessively formal sense, as long as this is not expressly defined herein.

Transportation vehicles having keyless systems (passive entry/exit/start systems) generally communicate with their involved system partners, for example, the transportation vehicle key, via low-frequency (LF) and high-frequency (HF) bands to make it possible to passively unlock, lock or start the engine. The communication between the keyless system partners in the LF band can have interference during the communication or at the start of the communication from other systems communicating via LF (LF interferers). These LF interferers can be special accessories or other electronic parts in the transportation vehicle, for example, wireless chargers for mobile telephones or wireless chargers for the wireless electromagnetic charging of the transportation vehicle battery.

In conventional systems, system-internal signals, for example, can be provided as an interface for signaling existing keyless communication from the keyless system. In this case, the keyless system signals to the transportation vehicle only that LF communication is intended to take place. Vehicle-internal potential interferers are then disconnected for the duration of the LF communication (for example, the transportation vehicle's own wireless chargers, fans, etc.). This is carried out irrespective of whether or not the system actually has interference.

In this case, actual interference is not detected, users cannot be informed of interference and countermeasures cannot be taken. Other functions are disconnected as a precaution in this case irrespective of whether there is interference.

In contrast, exemplary embodiments can identify actual interference and can only then initiate countermeasures. Radio receivers which are present in the system anyway or additional radio receivers can monitor, for example, whether there is actually interference. Only if interference is actually identified are countermeasures carried out. At least some exemplary embodiments are therefore able to identify interferers even before communication.

FIG. 1 illustrates a flowchart of an exemplary embodiment of a method for reducing interference in temporary communication resources used for wireless communication between a transportation vehicle key 200 and a transportation vehicle 100. In this case, a frequency range used for the wireless communication between the transportation vehicle key 200 and the transportation vehicle 100, for example, may have interference from an interference signal from the interferer. In this case, the interferer may be outside the system: in some exemplary embodiments, the interference may not be based on key signals or on communication of other key components, but rather on radio emissions from a wireless charger for a mobile device or for a battery of the transportation vehicle, for example. In at least some exemplary embodiments, interference can correspond to a presence of interference signals or noise which can be superimposed on and/or distort the wireless communication. The interferer can correspond, for example, to a device or a component which emits signals in the frequency range of the wireless communication. The wireless communication between the transportation vehicle key 200 and the transportation vehicle 100 can be based on a key communication system, for example, and the interferer causing the interference can be an interferer outside the system. In at least some exemplary embodiments, the wireless communication may be two-sided, that is to say there is data interchange from the transportation vehicle key 200 to the transportation vehicle 100 and from the transportation vehicle 100 to the transportation vehicle key 200. In at least some exemplary embodiments, the wireless communication can take place in a low-frequency frequency range, for example, in a 20-22 kHz, 125 kHz or 134 kHz frequency band. In at least some exemplary embodiments, the wireless communication can take place in a first frequency range, for example, an LF frequency range, and a response to the wireless communication from the transportation vehicle key 200 can take place, for example, in a second frequency range, for instance, an HF frequency range. For example, the wireless communication can be designed to activate the transportation vehicle key 200 or to signal to the latter that an authentication signal should be made available to the transportation vehicle 100.

The method comprises ascertaining 10 whether there is interference in the temporary communication resources. If there is interference, the method also comprises disconnecting 20 an interferer causing the interference or adapting 30 the use of the temporary communication resources for the wireless communication between the transportation vehicle key and the transportation vehicle 100.

In at least one exemplary embodiment, the ascertainment 10 can be carried out before communication between the wireless transportation vehicle key and the transportation vehicle. For example, the ascertainment 10 may comprise checking the temporary communication resources to determine whether there is interference or whether there could be interference at the time of the wireless communication. If there is no interference (or no interference is expected), the wireless communication could be carried out, otherwise the interferer could be disconnected or a transmission time could be adapted.

Figure 2:
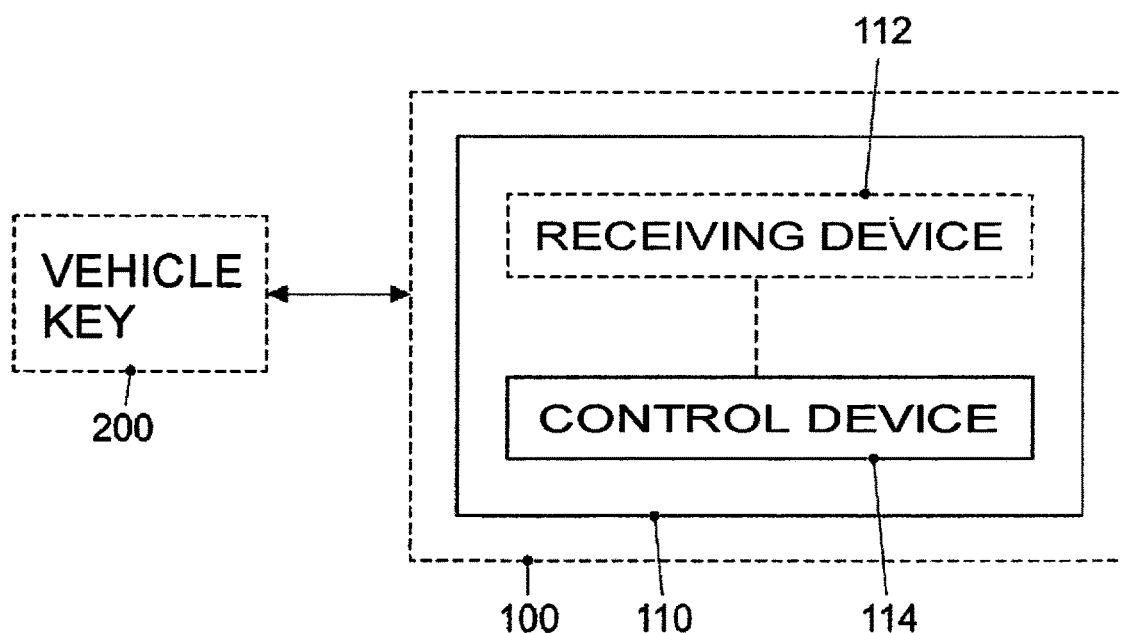
FIG. 2 illustrates a block diagram of an exemplary embodiment of an apparatus for reducing interference in temporary communication resources used for wireless communication between a transportation vehicle key and a transportation vehicle.

FIG. 2 shows an exemplary implementation of the method by an apparatus 110 for reducing the interference in the temporary communication resources used for the wireless communication between the transportation vehicle key 200 and the transportation vehicle 100. A control device 114 is designed to carry out the method operations of ascertaining 10, disconnecting 20 and adapting 30 as well as suboperations of the method operations. The apparatus 110 comprises the control device 114.

Figure 3:
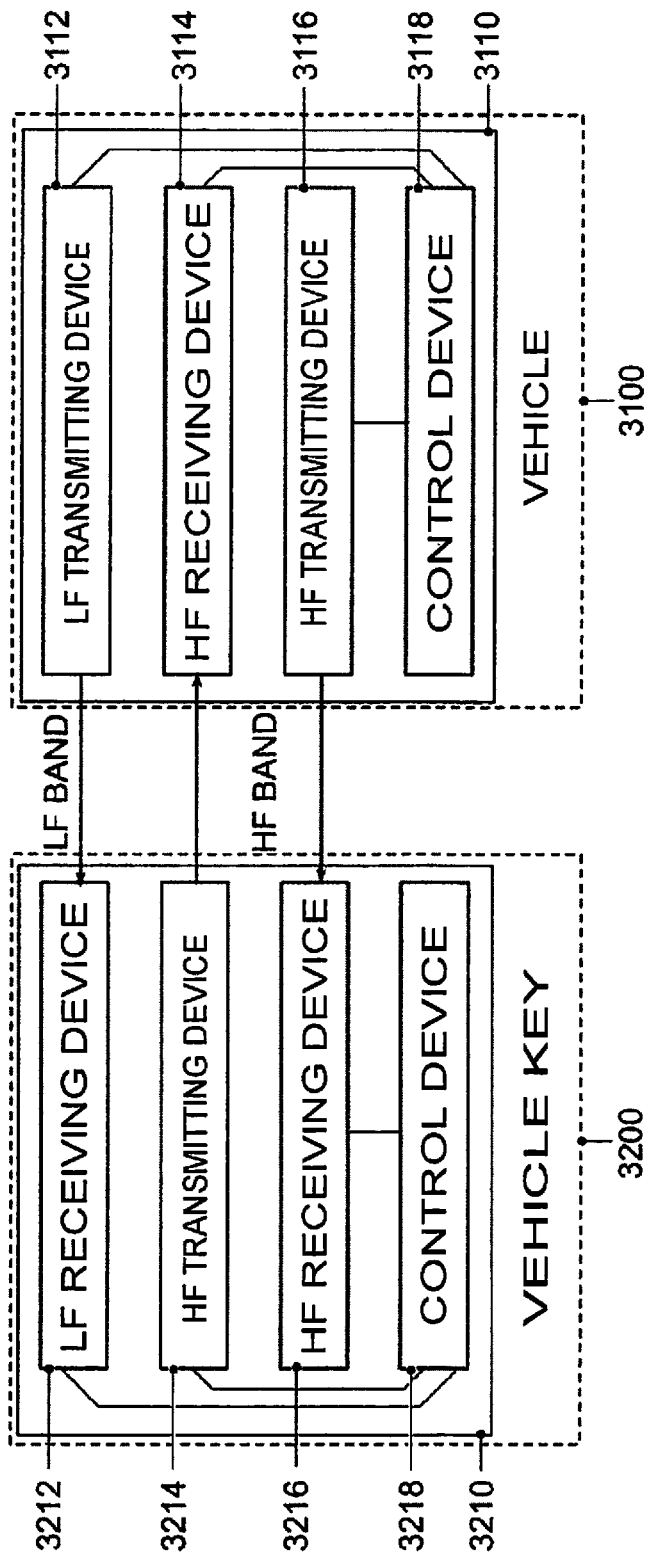
FIG. 3 illustrates a block diagram of an exemplary embodiment of a system comprising a transportation vehicle key and a transportation vehicle.

FIG. 3 illustrates a block diagram of an exemplary embodiment of a system comprising a transportation vehicle key 3200 and a transportation vehicle 3100. The transportation vehicle 3100 comprises, by way of example, an apparatus 3110 having an LF transmitting device 3112, an HF receiving device 3114, an HF transmitting device 3116 and a control device 3118. The transportation vehicle key 3200 comprises an apparatus 3210 having an LF receiving device 3212, an HF transmitting device 3214, an HF receiving device 3216 and a control device 3218. The transportation vehicle key 3200 may correspond to the transportation vehicle 200, for example, and/or the transportation vehicle 3100 may correspond to the transportation vehicle 100. The apparatuses 3210 or 3110 may correspond to the apparatus 110, for example, wherein the control devices 3218 or 3118 may correspond to the control device 114. An HF frequency range may be, for example, below 1 GHz (high frequency, ultra-high frequency) or above 1 GHz (for example, in the ultra-wideband (UWB) or in frequency ranges which are used by BLUETOOTH® or wireless local access networks (WLAN)).

The transportation vehicle 3100 can initiate the wireless communication with the transportation vehicle key 3200 via an LF band, for example, or can activate the transportation vehicle key on the basis of the wireless communication. On the basis of this wireless communication, the control device 3218 can be designed to provide the HF receiving device 3114 with authentication information relating to the key system via the HF transmitting device 3214.

Figure 1A:
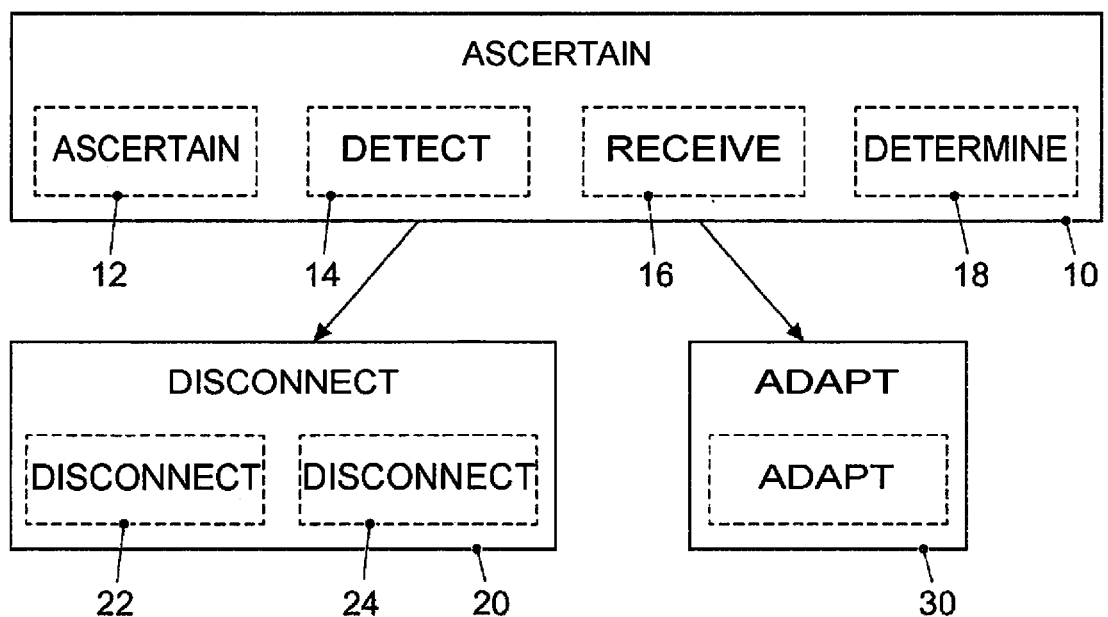
FIG. 1a illustrates a flowchart of a more detailed exemplary embodiment of a method for reducing interference in temporary communication resources used for wireless communication between a transportation vehicle key and a transportation vehicle.

FIG. 1a shows a more detailed flowchart of an exemplary embodiment of the method. The ascertainment 10 can comprise, for example, detecting 14 interference on the basis of a receiver for the wireless communication between the transportation vehicle key 200 and the transportation vehicle 100 or on the basis of a further receiver. For example, the apparatus 110 can comprise the receiver for the wireless communication between the transportation vehicle key 200 and the transportation vehicle and/or the further receiver. The receivers may be designed, for example, to receive and/or analyze signals in the frequency range used for the wireless communication between the transportation vehicle key 200 and the transportation vehicle 100. The detection 14 of the interference can correspond, for example, to performance of a frequency analysis, for example, to detect interference in the frequency range. For example, the detection 14 can also correspond to an identification of interferers, for example, on the basis of an interference profile of the interferer or on the basis of the determination of a position of the interferer (for example, inside the transportation vehicle), for instance, by analyzing the field strength or analyzing an effect of multi-path propagation. The detection 14 can also comprise detecting a periodicity of the interference, for instance, to ascertain 12 a subset of temporary communication resources used by an interferer, for instance, to predict likely times of interference from an interferer.

For example, an interference signal can be detected 14 in the transportation vehicle 100 or in the transportation vehicle key 200 with the aid of the existing LF receivers. In this case, the relevant LF band can be scanned (the frequency range). In this case, the interference detection can be carried out shortly before a planned transmitting operation. No additional hardware is needed for this purpose in at least some exemplary embodiments, and effort for searching for interferers may be low since the search is carried out by the system part which also wishes to establish the communication. Therefore, the search can be reduced to relevant times and processing effort and energy can be saved as a result. Alternatively, the transportation vehicle or/and the transportation vehicle key can comprise an additional LF receiver which is used, for example, only to detect 14 interferers. This receiver can be improved, for example, for the detection 14 of interferers and can be designed, for example, to search for interferers in parallel with the existing system.

Alternatively or additionally, the ascertainment 10 may comprise receiving 16 a notification relating to a malfunction from the transportation vehicle key 200. The transportation vehicle key 200 may be designed, for example, to provide the transportation vehicle 100 with the notification relating to the malfunction, for example, via a further frequency range or by transmitting a shortened signal. For example, a first frequency range can be used to transmit an activation signal between the transportation vehicle 100 and the transportation vehicle key 200 during the wireless communication. The notification relating to the malfunction can be received 16 from the transportation vehicle key 200 via a second frequency range which differs from the first frequency range. For example, the first frequency range may correspond to an LF frequency range, and the second frequency range may correspond to an HF frequency range. For example, the transportation vehicle key 200 can be designed to determine and transmit the notification relating to the malfunction on the basis of unconfirmed wireless communication, or the transportation vehicle key 200 may comprise a receiver and may be designed to detect interference, in a similar manner to the detection 14, for the notification relating to the malfunction. For example, an LF receiver installed in the key can be used to detect interferers. If interferers are detected, the transportation vehicle key 200 can be designed, for example, to report interference to the transportation vehicle 100 using another radio frequency. Countermeasures can be taken in the transportation vehicle key 200 and/or the transportation vehicle 100. For example, the transportation vehicle key 200 can be designed to adapt a transmission time on the basis of the detected interference, for example, in the case of a detected periodicity of the interference. In some exemplary embodiments, the transportation vehicle key 200 can be designed to receive an announcement relating to imminent wireless communication in a further (for instance, HF) frequency range. If the wireless communication is not received after the announcement or is damaged, the transportation vehicle key 200 can be designed to detect interference and to provide the notification relating to the interference. The ascertainment 10 can ascertain the interference on the basis of the notification relating to the interference.

In at least one exemplary embodiment, the control device 3118 can be designed to wirelessly communicate with the transportation vehicle key 3200 via the first frequency range (for example, an LF frequency range). If this communication fails, the control device 3218 can be designed, for example, to detect the absence or failure of the wireless communication. For example, the control device 3118 can be designed to provide the control device 3218 with a notification relating to imminent wireless communication via the HF transmitting device 3216 or the HF receiving device 3116 before the wireless communication. The control device 3218 can then detect the failure of the wireless communication, for example, on the basis of this notification. Alternatively or additionally, the control device 3218 can be designed to determine interference in the LF band via the LF receiving device 3212 or a further receiving device, for example, by identifying an interference signal. The control device 3218 can also be designed to provide the HF receiving device 3114 with the notification relating to the interference via the HF transmitting device 3214.

In one exemplary implementation, the apparatus 110 can also comprise a receiving device 112. The control device 114 can be designed to control the receiving device 112. The control device 114 can be designed to ascertain whether there is interference via the receiving device 112 on the basis of a receiver for the wireless communication between the transportation vehicle key 200 and the transportation vehicle 100, on the basis of a further receiver or on the basis of a notification relating to a malfunction from the transportation vehicle key 200. The receiving device 112 can be designed, for example, to receive data packets or signals from the receiver, the further receiver and/or the transportation vehicle key.

Alternatively or additionally, the ascertainment 10 may comprise determining 18 the interference on the basis of previous communication. For example, the determination 18 may comprise waiting for one or more communication attempts. If these attempts fail, the determination 18 can detect interference and can react by disconnection 20 or adaptation 30. In this case, it is possible to dispense with measuring the interference in some exemplary embodiments. After unsuccessful communication, countermeasures against interferers can be taken. If renewed communication is then successful, it is possible to infer from this with a high degree of probability that there was interference. Additional measures can then be taken (for example, disconnection 20 of the interferer and renewed communication, warning to the user). Functional limitations caused by countermeasures only take place in some exemplary embodiments after one or more communication attempts have failed. In some exemplary embodiments, for example, if interference is assumed, the determination 18 may comprise providing an announcement relating to wireless communication, for example, in another (for example, HF) frequency range, for example, via the HF transmitting device 3216. If the wireless communication is not received after the announcement, interference can be detected.

In at least some exemplary embodiments, the disconnection 20 of the interferer can correspond to disconnection 22 of an interferer included in the transportation vehicle 100. For example, the disconnection 22 can correspond to deactivation of one or more devices of the transportation vehicle, for which it is known that they can cause interference in the wireless communication frequency range. The disconnection 22 can be initiated, for example, via a communication bus or via a transportation vehicle network (for instance, via a control network (also called a Controller Area Network, CAN) and/or via a local line network (also called a Local Interconnect Network, LIN) or Ethernet), for example, via one or more control devices of the transportation vehicle. For example, the ascertainment 10 can comprise identifying the one or more devices, for example, on the basis of exclusion of interferers by short-term disconnection or on the basis of an interference profile of the one or more devices of the transportation vehicle, and the disconnection 22 can be based on the identification.

Alternatively or additionally, the disconnection 20 of the interferer can correspond to disconnection 24 of an interferer coupled to the transportation vehicle, for example, by a control instruction via a communication connection or by deactivating a power supply, for instance, a 12 V interface. For example, the ascertainment 10 may comprise temporarily deactivating a power supply for devices coupled via the 12 V interface to ascertain whether the interferer is thus disconnected. If this is the case, the device can be temporarily deactivated during the wireless communication or a user can be made aware, by providing a warning, of the fact that the device is causing interference, for example, with the request to deactivate the device.

Alternatively or additionally, the ascertainment 10 can comprise ascertaining 12 a subset of temporary communication resources used by an interferer. For example, the ascertainment 12 can comprise ascertaining a periodicity of one or more interference events. On the basis of the periodicity, the subset of temporary communication resources used by the interferer can then be determined, for example, by the control device 114. The adaptation 30 may comprise adapting 32 a transmission time for the wireless communication between the transportation vehicle key 200 and the transportation vehicle 100, thus reducing or eliminating a collision between the subset of temporary communication resources used by the interferer and the temporary communication resources for the wireless communication between the transportation vehicle key 200 and the transportation vehicle 100. The adaptation 32 can correspond, for example, to a shift of the transmission time, with the result that the wireless communication uses temporary communication resources which are not likely to have interference. For example, the temporary communication resources can be subdivided into slots and the wireless communication can take place in slots for which the ascertainment does not reveal any interference.

Alternatively or additionally, the adaptation 30 can also comprise adapting a transmission power for the wireless communication. For example, the transmission power can be increased, for instance, to achieve usable wireless communication despite interference.

In some exemplary embodiments, the method can also comprise providing a warning for the user if interference has been detected. The warning can correspond, for example, to a display of a warning on a screen, a warning tone, a voice output, activation of a warning light or a display of a warning animation. The warning can be designed to warn the user that there is interference in the communication between the transportation vehicle key 200 and the transportation vehicle 100, for example, with a suggestion to disconnect an interferer outside the transportation vehicle or to insert the transportation vehicle key for a conventional start or to move the transportation vehicle key into a predefined position, for example, for an emergency start.

The control device 114 can be designed, for example, to provide the user with the warning via an output device, for example, a screen or a loudspeaker. In some exemplary embodiments, the apparatus 110 can comprise the output device.

In at least some exemplary embodiments, the transportation vehicle 100 could correspond, for example, to a land transportation vehicle, a watercraft, an aircraft, a rail transportation vehicle, a road transportation vehicle, an automobile, an all-terrain transportation vehicle, a motorized transportation vehicle or a heavy goods transportation vehicle.

In exemplary embodiments, the transportation vehicle key 200 can correspond to a key (for instance, an ignition key) of a transportation vehicle, which key comprises, for example, a physical key component (for example, a key bit) and/or an electronic key component. For example, the transportation vehicle key 200 can comprise a transmitting device to wirelessly communicate with the transportation vehicle 100. In addition, the physical key component can be used as a transmission medium, for example, to transmit signals from the electronic key component. The electronic key component could correspond, for example, to a microchip and/or a programmable hardware component which is designed to provide an electronic key, for example, a secret key (also called secure key, SK). The electronic key component can be designed to provide the transportation vehicle 100 with the secret key or a processed secret key, for example, via a wired or wireless communication connection.

In exemplary embodiments, the control device 114 can correspond to any desired controller or processor or a programmable hardware component. For example, the control device 114 can also be implemented as software which is programmed for a corresponding hardware component. In this respect, the control device 114 can be implemented as programmable hardware with accordingly adapted software. Any desired processors, such as digital signal processors (DSPs), can be used in this case. In this case, exemplary embodiments are not restricted to a particular type of processor. Any desired processors or else a plurality of processors are conceivable for implementing the control device 114.

The receiving device 112 can correspond, for example, to one or more inputs for receiving information, for instance, in digital bit values, analog signals, magnetic fields, on the basis of a code, inside a module, between modules or between modules of different entities. For example, the receiving device 112 can be designed to receive signals in the frequency range used for the communication between the transportation vehicle key 200 and the transportation vehicle 100 or in a further frequency range. For example, the receiving device can be designed to receive data or signals from further modules, for example, the receivers, via a bus system or via a direct wired line.

In some exemplary embodiments, the transportation vehicle 100 can comprise the apparatus 110. Alternatively or additionally, the transportation vehicle key 200 can comprise the apparatus 110. The optional receiving device 112 is coupled to the control device 114. For example, the transportation vehicle 100 and/or the transportation vehicle key 200 can comprise (a) control device(s) which is/are designed to carry out the method in FIG. 1/1a.

Another exemplary embodiment is a computer program for carrying out at least one of the methods described above when the computer program runs on a computer, a processor or a programmable hardware component. Another exemplary embodiment is also a digital storage medium which is machine-readable or computer-readable and has electronically readable control signals which can interact with a programmable hardware component in such a manner that one of the methods described above is carried out.

The features disclosed in the above description, the following claims and the accompanying figures may be important and may be implemented both individually and in any desired combination for the purpose of implementing an exemplary embodiment in its various configurations.

Although some embodiments have been described in connection with an apparatus, it goes without saying that these embodiments are also a description of the corresponding method, with the result that a block or a component of an apparatus should also be understood as meaning a corresponding method operation or a feature of a method operation. In a similar manner, embodiments which have been described in connection with or as a method operation are also a description of a corresponding block or detail or feature of a corresponding apparatus.

Depending on particular implementation requirements, exemplary embodiments may be implemented in hardware or software. Implementation may be carried out using a digital storage medium, for example, a floppy disk, a DVD, a Blu-ray disc, a CD, a ROM, a PROM, an EPROM, an EEPROM or a flash memory, a hard disk or another magnetic or optical memory which stores electronically readable control signals which may interact or interact with a programmable hardware component in such a manner that the respective method is carried out.

A programmable hardware component may be formed by a processor, a computer processor (CPU=Central Processing Unit), a graphics processor (GPU=Graphics Processing Unit), a computer, a computer system, an application-specific integrated circuit (ASIC), an integrated circuit (IC), a system-on-chip (SoC), a programmable logic element or a field programmable gate array (FPGA) with a microprocessor.

The digital storage medium may therefore be machine-readable or computer-readable. Some exemplary embodiments therefore comprise a data storage medium having electronically readable control signals which are able to interact with a programmable computer system or a programmable hardware component in such a manner that one of the methods described herein is carried out. At least one exemplary embodiment is therefore a data storage medium (or a digital storage medium or a computer-readable medium) on which the program for carrying out one of the methods described herein is recorded.

Exemplary embodiments can generally be implemented as a program, firmware, a computer program or a computer program product with a program code or as data, the program code or the data being effective so as to carry out one of the methods when the program runs on a processor or a programmable hardware component. The program code or the data may also be stored, for example, on a machine-readable carrier or data storage medium. The program code or the data may be, inter alia, of source code, machine code or byte code and another intermediate code.

Another exemplary embodiment is also a data stream, a signal sequence or a sequence of signals representing the program for carrying out one of the methods described herein. The data stream, the signal sequence or the sequence of signals can be configured, for example, so as to be transferred via a data communication connection, for example, via the Internet or another network. Exemplary embodiments are therefore also signal sequences which represent data and are suitable for transmission via a network or a data communication connection, the data representing the program.

A program according to at least one exemplary embodiment may implement one of the methods during its execution, for example, by reading memory locations or writing a data item or a plurality of data items to the memory locations, as a result of which switching operations or other operations are possibly caused in transistor structures, in amplifier structures or in other electrical, optical or magnetic components or components operating according to another functional principle. Accordingly, data, values, sensor values or other information can be acquired, determined or measured by a program by reading a memory location. A program can therefore acquire, determine or measure variables, values, measurement variables and other information by reading one or more memory locations and can effect, cause or carry out an action and can actuate other devices, machines and components by writing to one or more memory locations.

The exemplary embodiments described above are only an illustration of the principles of the present disclosure. It goes without saying that modifications and variations of the arrangements and details described herein will be apparent to other experts. Therefore, the intention is for the disclosure to be restricted only by the scope of protection of the following patent claims and not by the specific details presented herein using the description and the explanation of the exemplary embodiments.

LIST OF REFERENCE SYMBOLS

10 Ascertain
12 Ascertain
14 Detect
16 Receive
18 Determine
20 Disconnect
22 Disconnect
24 Disconnect
30 Adapt
32 Adapt
100 Transportation vehicle
110 Apparatus
112 Receiving device
114 Control device
100 Transportation vehicle key
3100 Transportation vehicle
3110 Apparatus
3112 LF transmitting device
3114 HF receiving device
3116 HF transmitting device
3118 Control device
3200 Transportation vehicle key
3210 Apparatus
3212 LF receiving device
3214 HF transmitting device
3216 HF receiving device
3218 Control device

The invention claimed is:

1. A method for reducing interference in temporary communication resources used for wireless communication between a transportation vehicle key and a transportation vehicle, the method comprising:
ascertaining whether there is interference in the temporary communication resources and, in response to ascertaining the interference, ascertaining a subset of temporary communication resources used by an interferer; and
adapting the use of the temporary communication resources for the wireless communication between the transportation vehicle key and the transportation vehicle by adapting a transmission time for the wireless communication between the transportation vehicle key and the transportation vehicle, thus reducing a collision between the subset of temporary communication resources used by the interferer and the temporary communication resources for the wireless communication between the transportation vehicle key and the transportation vehicle.

2. The method of claim 1, wherein the ascertainment is carried out before communication between the wireless transportation vehicle key and the transportation vehicle.

3. The method of claim 1, wherein a frequency range which is used for the wireless communication between the transportation vehicle key and the transportation vehicle has interference from an interference signal from the interferer.

4. The method of claim 1, wherein the disconnection of the interferer corresponds to disconnection of an interferer included in the transportation vehicle, or wherein the disconnection of the interferer corresponds to disconnection of an interferer coupled to the transportation vehicle.

5. The method of claim 1, wherein the ascertainment comprises detecting interference based on a receiver for the wireless communication between the transportation vehicle key and the transportation vehicle or based on a further receiver, and/or
wherein the ascertainment comprises receiving a notification relating to a malfunction from the transportation vehicle key, and/or
wherein a first frequency range is used to transmit an activation signal between the transportation vehicle and the transportation vehicle key during the wireless communication, wherein the ascertainment comprises receiving a notification relating to a malfunction from the transportation vehicle key via a second frequency range which differs from the first frequency range, and/or
wherein the ascertainment comprises determining the interference based on previous communication.

6. The method of claim 1, wherein the wireless communication between the transportation vehicle key and the transportation vehicle is based on a key communication system, and wherein the interferer causing the interference is an interferer outside the system.

7. A program having a program code for carrying out a method for reducing interference in temporary communication resources used for wireless communication between a transportation vehicle key and a transportation vehicle when the program code is executed on a computer, a processor, a control module or a programmable hardware component, the-method comprising:
ascertaining whether there is interference in the temporary communication resources and, in response to ascertaining the interference, ascertaining a subset of temporary communication resources used by an interferer; and
adapting the use of the temporary communication resources for the wireless communication between the transportation vehicle key and the transportation vehicle by adapting a transmission time for the wireless communication between the transportation vehicle key and the transportation vehicle, thus reducing a collision between the subset of temporary communication resources used by the interferer and the temporary communication resources for the wireless communication between the transportation vehicle key and the transportation vehicle.

8. The program of claim 7, wherein adapting the use of the temporary communication resources for the wireless communication between the transportation vehicle key and the transportation vehicle further includes increasing a transmission power of a useful signal between the transportation vehicle key and the transportation vehicle.

9. The program of claim 7, wherein adapting the use of the temporary communication resources for the wireless communication between the transportation vehicle key and the transportation vehicle further includes decreasing a transmission power of an interferer signal.

10. The program of claim 7, wherein the method further comprises decreasing interference by disconnecting vehicle transmission power to an interferer that is a component integral to the transportation vehicle or to an interferer electrically coupled to the transportation vehicle.

11. The program of claim 10, wherein the interferer electrically coupled to the transportation vehicle is a wireless charging cradle powered by the transportation vehicle.

12. An apparatus for reducing interference in temporary communication resources used for wireless communication between a transportation vehicle key and a transportation vehicle, the apparatus comprising:
a control device designed to:
ascertain whether there is interference in the temporary communication resources and, in response to ascertaining the interference, ascertain a subset of temporary communication resources used by an interferer; and
adapt the use of the temporary communication resources for the wireless communication between the transportation vehicle key and the transportation vehicle by adapting a transmission time for the wireless communication between the transportation vehicle key and the transportation vehicle, thus reducing a collision between the subset of temporary communication resources used by the interferer and the temporary communication resources for the wireless communication between the transportation vehicle key and the transportation vehicle.

13. The apparatus of claim 12, further comprising a receiving device, wherein the control device controls the receiving device, and wherein the control device ascertains whether there is interference via the receiving device based on a receiver for the wireless communication between the transportation vehicle key and the transportation vehicle, based on a further receiver or based on a notification relating to a malfunction.

14. The apparatus of claim 12, wherein the control device is further designed to adapt the use of the temporary communication resources for the wireless communication between the transportation vehicle key and the transportation vehicle by increasing a transmission power of a useful signal between the transportation vehicle key and the transportation vehicle.

15. The apparatus of claim 12, wherein the control device is further designed to adapt the use of the temporary communication resources for the wireless communication between the transportation vehicle key and the transportation vehicle by decreasing a transmission power of an interferer signal.

16. The apparatus of claim 12, wherein a frequency range which is used for the wireless communication between the transportation vehicle key and the transportation vehicle has interference from an interference signal from the interferer.

17. The apparatus of claim 12, wherein the control device is further designed to disconnect the interferer by disconnecting an interferer integral to the transportation vehicle or an interferer electrically coupled to the transportation vehicle.

18. The apparatus of claim 17, wherein the disconnecting includes deactivating a component integral to the transportation vehicle by disconnecting transportation vehicle power provided thereto.

19. The apparatus of claim 17, wherein the interferer electrically coupled to the transportation vehicle is a wireless charging cradle powered by the transportation vehicle.

* * * * *